(12) United States Patent
Liu et al.

(10) Patent No.: US 11,720,100 B2
(45) Date of Patent: Aug. 8, 2023

(54) SYSTEMS AND METHODS FOR UTILIZING SEMANTIC INFORMATION FOR NAVIGATION OF A ROBOTIC DEVICE

(71) Applicant: QUALCOMM Incorporated, San Diego, CA (US)

(72) Inventors: Xiaohui Liu, Beijing (CN); Yibo Jiang, Shanghai (CN); Jiangtao Ren, Beijing (CN); Lei Xu, Beijing (CN); Yanming Zou, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 524 days.

(21) Appl. No.: 16/621,518

(22) PCT Filed: Mar. 14, 2018

(86) PCT No.: PCT/CN2018/078960
§ 371 (c)(1),
(2) Date: Dec. 11, 2019

(87) PCT Pub. No.: WO2019/019660
PCT Pub. Date: Jan. 31, 2019

(65) Prior Publication Data
US 2020/0097006 A1   Mar. 26, 2020

(51) Int. Cl.
*G05D 1/00* (2006.01)
*G06T 7/521* (2017.01)
(Continued)

(52) U.S. Cl.
CPC ....... *G05D 1/0088* (2013.01); *G05B 19/4155* (2013.01); *G06T 1/0014* (2013.01);
(Continued)

(58) Field of Classification Search
CPC .... G05D 1/0088; G05D 1/0231; G05D 1/027; G06T 7/521; G06T 7/70; G06T 1/0014;
(Continued)

(56) References Cited

U.S. PATENT DOCUMENTS

| 8,386,079 B1 | 2/2013 | Kohler et al. |
| 9,662,784 B2 | 5/2017 | Bostick et al. |

(Continued)

FOREIGN PATENT DOCUMENTS

| CN | 102313547 A | 1/2012 |
| CN | 103105926 A | 5/2013 |

(Continued)

OTHER PUBLICATIONS

International Search Report and Written Opinion—PCT/CN2017/094876—ISA/EPO—dated Apr. 20, 2018, 8 pages.
(Continued)

*Primary Examiner* — Tyler J Lee
*Assistant Examiner* — Tiffany P Ohman
(74) *Attorney, Agent, or Firm* — The Marbury Law Group, PLLC (57) ABSTRACT

Various embodiments include methods for improving navigation by a processor of a robotic device. Such embodiments may include initiating a start of a predetermined time period associated with semantic information extraction, and determining whether an adverse event related to one or more sensors of the robotic device is detected. Such embodiments may also include identifying a current time slot of the predetermined time period, identifying a current estimated position and orientation of the robotic device, and recording updates to semantic information stored for the one or more sensor based on the identified current time slot and the current estimated position and orientation of the robotic device in response to determining that an adverse event related to one or more sensors of the robotic device is detected.

35 Claims, 6 Drawing Sheets

(51) Int. Cl.
*G06T 7/70* (2017.01)
*G05B 19/4155* (2006.01)
*G06T 1/00* (2006.01)
*G07C 5/04* (2006.01)
*G07C 5/08* (2006.01)
*G01S 19/49* (2010.01)
*G05D 1/02* (2020.01)
*G01S 19/48* (2010.01)

(52) U.S. Cl.
CPC ............... *G06T 7/521* (2017.01); *G06T 7/70* (2017.01); *G07C 5/04* (2013.01); *G07C 5/085* (2013.01); *G07C 5/0808* (2013.01); *G01S 19/485* (2020.05); *G01S 19/49* (2013.01); *G05B 2219/50391* (2013.01); *G05D 1/027* (2013.01); *G05D 1/0231* (2013.01); *G06T 2207/10028* (2013.01); *G06T 2207/30244* (2013.01); *G06T 2207/30252* (2013.01)

(58) Field of Classification Search
CPC . G06T 2207/10028; G06T 2207/30244; G06T 2207/30252; G05B 19/4155; G05B 2219/50391; G07C 5/04; G07C 5/0808; G07C 5/085; G01S 19/49
USPC ........................................................ 701/29.2
See application file for complete search history.

(56) References Cited

U.S. PATENT DOCUMENTS

| | | |
|---|---|---|
| 2014/0005933 A1 | 1/2014 | Fong et al. |
| 2014/0129027 A1* | 5/2014 | Schnittman .......... G05D 1/0242 700/253 |
| 2015/0239482 A1 | 8/2015 | Green et al. |
| 2016/0282126 A1 | 9/2016 | Watts et al. |
| 2016/0349362 A1* | 12/2016 | Rohr ...................... G01S 17/06 |
| 2017/0029213 A1 | 2/2017 | Johnson et al. |
| 2017/0057528 A1 | 3/2017 | Green et al. |
| 2021/0027112 A1* | 1/2021 | Brewington ......... G06V 10/462 |

FOREIGN PATENT DOCUMENTS

| | | |
|---|---|---|
| WO | 2012161597 A2 | 11/2012 |
| WO | 2017/037423 A1 | 3/2017 |

OTHER PUBLICATIONS

International Search Report and Written Opinion—PCT/CN2018/078960—ISA/EPO —May 30, 2018, 9 pages.

* cited by examiner

SYSTEMS AND METHODS FOR UTILIZING SEMANTIC INFORMATION FOR NAVIGATION OF A ROBOTIC DEVICE

BACKGROUND

Robotic devices have become increasingly commonplace for performing various tasks in a semi-autonomous or autonomous manner. Such robotic devices may be embodied in a variety of forms and used in a variety of applications, such as in automated vacuum cleaners, unmanned aerial vehicles, terrestrial vehicle, etc. Applications for which robotic devices may be employed may include entertainment applications (e.g., toy robots), utility applications in environments that are unfriendly to humans (e.g., space, deep water, cold temperature, radiation, chemical exposure, biohazards, etc.), dangerous tasks (e.g., defusing of explosives), operation in confined spaces (e.g., collapsed buildings) performing menial tasks (e.g., cleaning), etc.

Since many environments are not static, a robotic device may be provided with mapping techniques allowing the device to construct a map of its surroundings. Further, a robotic device may be configured to localize itself within the map, and thereby exhibit a relatively high degree of autonomy. However, autonomous navigation may be complex due to temporal and spatial variations in the local environment, as well as changes in the position and motion of obstacles. Such complexities may create navigation problems for the robotic device using existing techniques.

SUMMARY

Various embodiments include methods performed by a processor of a robotic device for improving navigation. Various embodiments may include initiating a start of a predetermined time period associated with semantic information extraction, determining whether an adverse event related to one or more sensors of the robotic device is detected, and in response to determining that an adverse event related to one or more sensors of the robotic device is detected, identifying a current time slot of the predetermined time period, identifying a current estimated position and orientation of the robotic device, and recording updates to semantic information stored for the one or more sensor based on the identified current time slot and the current estimated position and orientation of the robotic device. In some embodiments, the adverse event may indicate unreliability of the one or more sensor.

Some embodiments may further include determining whether the predetermined time period has ended, and in response to determining that the predetermined time period has ended, identifying, for each sensor, any spatial region of low performance within a local environment of the robotic device based on stored semantic information, and adjusting a weight factor applied to measurements from the sensor when the robotic device is at an identified spatial region of low performance.

Some embodiments may further include, in response to determining that the predetermined time period has ended, identifying, for each sensor, any times of low performance based on corresponding semantic information, and adjusting the weight factor applied to measurements from each sensor during identified times of low performance. In some embodiments, identifying, for each sensor, any spatial region of low performance may include determining whether the stored semantic information for the sensor indicates that a number of adverse event occurrences for a specific pose of the robotic device satisfies or exceeds a first event threshold.

In some embodiments, identifying, for each sensor, any time of low performance may include determining whether the stored semantic information indicates that a number of adverse event occurrences during a specific timeslot satisfies or exceeds a second event threshold. In some embodiments, determining whether an adverse event related to one or more sensors of the robotic device is detected may include, for each sensor, obtaining processed measurements output by pre-processor operations for the sensor, obtaining the current estimated position and orientation of the robotic device, and determining whether a difference between a pose indicated by the processed measurements and the current estimated position and orientation satisfies or exceeds a sensor-specific threshold. In some embodiments, determining whether an adverse event related to one or more sensors of the robotic device is detected may include determining that an adverse event is detected in response to receiving an outlier data measurement.

In some embodiments, the predetermined time period associated with semantic information extraction may be configured on a time server. In some embodiments, the time server maintains settings for timeslots of the predetermined time period.

In some embodiments, identifying the current estimated position and orientation of the robotic device may include obtaining output from localization operations on the robotic device. In some embodiments, the localization operations may be performed as part of a simultaneous localization and mapping (SLAM) process.

In some embodiments, the one or more sensors of the robotic device includes at least one image sensor, at least one inertial measurement unit (IMU) sensor, and at least one motion feedback sensor. In some embodiments, the semantic information stored for the one or more sensors may be represented in a data structure that provides a number of adverse event occurrences for each pose of the robotic device during each timeslot of the predetermined time period.

Various embodiments may include a robotic device having a processor configured with processor-executable instructions to perform operations of any of the methods summarized above. In some embodiments, the robotic device may be a ground vehicle. Various embodiments may include processing device for use in a robotic device and configured to perform operations of any of the methods summarized above. Various embodiments may include a robotic device having means for performing functions of any of the methods summarized above.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

DETAILED DESCRIPTION

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments include methods performed by a processor of a robotic device for improving navigation by identifying and adapting to temporal and spatial patterns in its surroundings. Specifically, the processor of the robotic device may employ localization and mapping techniques, such as simultaneous localization and mapping (SLAM), using sensor data that is weighted based on its reliability to plan a navigation path within the environment. In various embodiments, the processor of the robotic device may extract semantic information about situations that negatively affect performance and/or accuracy of one or more sensor used for localization. Examples of such situations maybe include poor lighting conditions or lack of objects in the environment, which may impact computer vision-based sensors. Further examples may include a particular flooring material or a degree of incline, which may impact wheel encoders. Various embodiments may be of particular usefulness in robotic devices configured to perform indoors where computer vision-based systems may face challenging conditions, compared to robotic devices configured to operate outdoors where consistent lighting conditions and a greater diversity and quantities of landmarks exist for use in vision-based navigation.

In various embodiments, the processor of the robotic device may extract semantic information by identifying and recording events that are indicated by variations in sensor performance across different positions of the robotic device and times. The semantic information may be used by the processor to adjust a weighting factor that is applied to measurements from the corresponding sensor, thereby improving input to the localization and/or mapping modules for performing SLAM functions. Additionally, such semantic information may be used by the processor for other navigation-related tasks, such as to compute a cost in path planning, to set task priorities, etc.

As used herein, the term "robotic device" refers to one of various types of robotic vehicles, robotic appliances, robots, etc. including an onboard processing device configured to provide some autonomous or semi-autonomous capabilities. Examples of robotic devices include but are not limited to: aerial vehicles, such as an unmanned aerial vehicle (UAV); ground vehicles and robots (e.g., autonomous or semi-autonomous cars, vacuum robots, search and rescue robots, bomb detection and disarming robots, etc.); water-based vehicles (i.e., surface watercraft and submarines); space-based vehicles (e.g., a spacecraft or space probe); and/or some combination thereof. In some embodiments, the robotic device may be manned. In other embodiments, the robotic device may be unmanned. In embodiments in which the robotic device is autonomous, the robotic device may include an onboard processing device configured to maneuver and/or navigate the robotic device without remote operating instructions (i.e., autonomously), such as from a human operator (e.g., via a remote computing device). In embodiments in which the robotic device is semi-autonomous, the robotic device may include an onboard processing device configured to receive some information or instructions, such as from a human operator (e.g., via a remote computing device), and autonomously maneuver and/or navigate the robotic device consistent with the received information or instructions. Various embodiments may be particularly useful for robotic devices configured to perform household tasks (e.g., vacuuming) while operating within buildings.

In some implementations, the robotic device may be an aerial vehicle (unmanned or manned), which may be a rotorcraft or winged aircraft. For example, a rotorcraft (also referred to as a multirotor or multicopter) may include a plurality of propulsion units (e.g., rotors/propellers) that provide propulsion and/or lifting forces for the robotic device. Specific non-limiting examples of rotorcraft include tricopters (three rotors), quadcopters (four rotors), hexacopters (six rotors), and octocopters (eight rotors). However, a rotorcraft may include any number of rotors. A robotic device may include a variety of components and/or payloads that may perform a variety of functions.

Robotic devices such as vehicles may employ simultaneous localization and mapping (SLAM) techniques to construct and update a map of an unknown environment while simultaneously keeping track of the robotic device's location within the environment. Robotic vehicles are increasingly equipped with image sensors for capturing images and video that may also be used to gather data useful for SLAM.

As used herein, the term "pose" refers to the position and orientation of a robotic device within the local environment. In a configuration in which a robotic device travels in two dimensions, such as along the surface of a floor, the pose of the robotic device may be specified by a two-dimensional position (x,y) and a heading ($\theta$).

Figure 1:
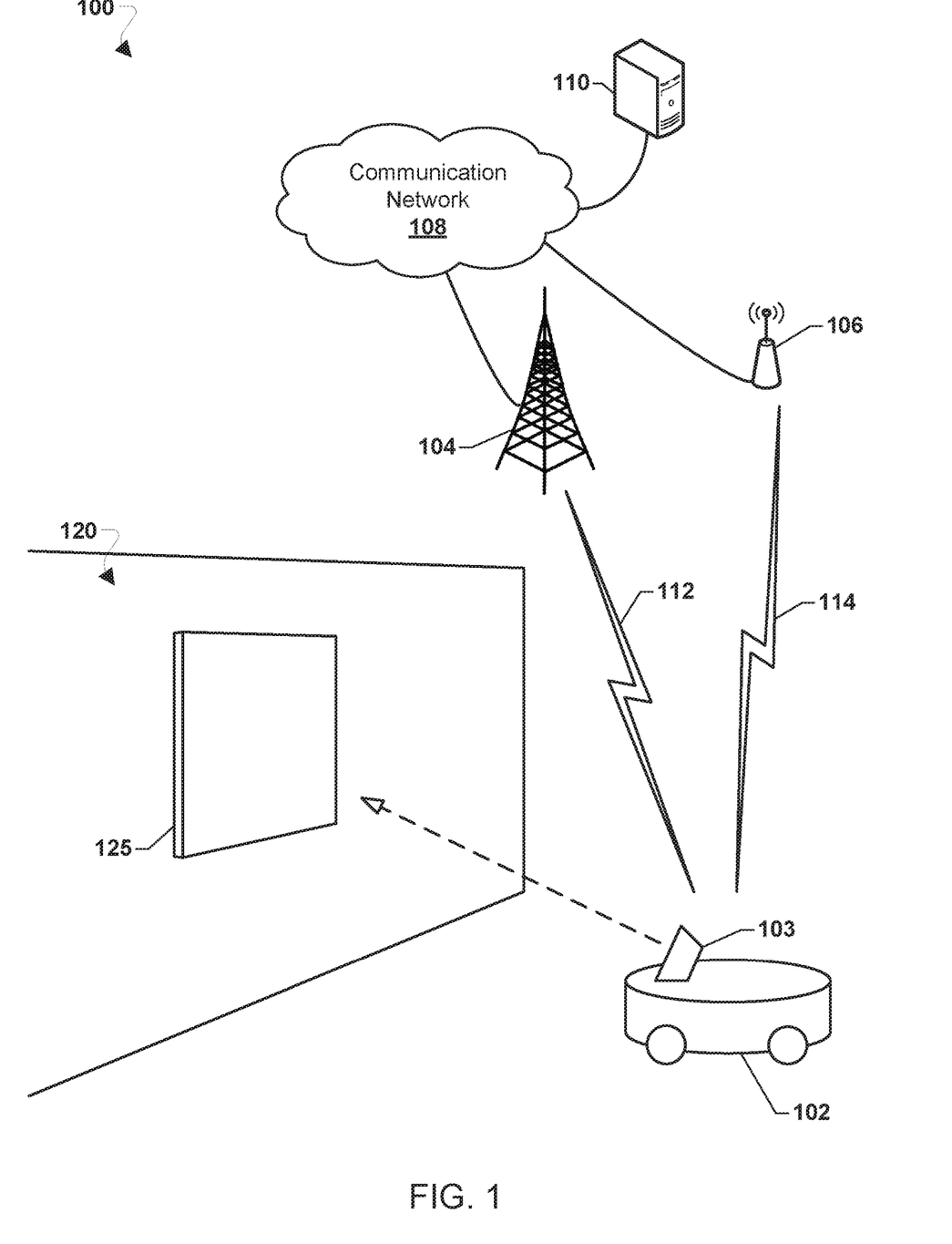
FIG. 1 is a system block diagram of a robotic device operating within a communication system according to various embodiments.

Various embodiments may be implemented within a robotic device operating within a variety of communication systems 100, an example of which is illustrated in FIG. 1. The communication system 100 may include a robotic device 102, a base station 104, an access point 106, a communication network 108, and a network element 110.

In some embodiments, the robotic device 102 may be equipped with at least one spatial measurement device 103, such as an imaging sensor (e.g., a camera). In some embodiments, the robotic device 102 may be equipped with any of a number of additional sensors useful for SLAM and navigation, such as wheel/rotary encoders, a global navigation satellite system (GNSS) receiver (e.g., a Global Positioning System (GPS) receiver), an inertial measurement unit (IMU) or components thereof (e.g., accelerometer, gyroscope, magnetometer, etc.), an orientation sensor, and a monocular image sensor.

The base station 104 may include base stations configured to provide wireless communications over a wide area (e.g., macro cells), as well as small cells, which may include a micro cell, a femto cell, a pico cell, and other similar network access points. The access point 106 may include access points configured to provide wireless communications over a relatively smaller area. Other examples of base stations and access points are also possible.

Devices including the robotic device 102 may communicate over the communication network 108 through wireless links provided by the base station 104 and the access point 106. The robotic device 102 may communicate with the base station 104 over a wireless communication link 112, and with the access point 106 over a wireless communication link 114. The wireless communication links 112 and 114 may include a plurality of carrier signals, frequencies, or frequency bands, each of which may include a plurality of logical channels. The wireless communication links 112 and 114 may utilize one or more radio access technologies (RATs). Examples of RATs that may be used in a wireless communication link include 3GPP Long Term Evolution (LTE), 3G, 4G, 5G, Global System for Mobility (GSM), Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs. Further examples of RATs that may be used in one or more of the various wireless communication links within the communication system 100 include medium range protocols such as Wi-Fi, LTE-U, LTE-Direct, LAA, MuLTEfire, and relatively short range RATs such as ZigBee, Bluetooth, and Bluetooth Low Energy (LE).

The network element 110 may connect the communication network 108 to the Internet and/or to a network server. The robotic device 102 may send information to and/or receive communications from the network element 110 via the communication network 108. The network element 110 may provide the robotic device 102 with a variety of information, such as navigation information, weather information, information about local air, ground, and/or sea traffic, movement control instructions, and other information, instructions, or commands relevant to operations of the robotic device 102.

In various embodiments, the robotic device 102 may move in an environment 120 and use one or more sensors, such as the spatial measurement device 103, to capture images of at least one target 125 in the environment 120.

Navigation of a robotic device in various embodiments may be performed autonomously using systems that rely on SLAM techniques to construct and update a map of the environment and localize the robotic device's location within the environment. While the localization and mapping processes may be performed simultaneously, the processes may instead be performed sequentially, such as in a multiplexed fashion. For example, a SLAM system may use the same data to both localize a robotic device within a map and to update the map.

Conventional SLAM systems employ algorithms to solve the computational problem of constructing or updating a map of an unknown environment while simultaneously keeping track of a devices location within the map. Typical modern SLAM systems are based on tracking a set of points through sensor inputs (e.g., a series of camera images or video frames), and using estimated locations of the tracked points in three-dimensional space to calculate the pose from which the device could have observed or measured the points. The same tracked point locations in three-dimensional space may be used to simultaneously construct or update a map of the local environment.

In some implementations, to accomplish SLAM, a robotic device that has a multicore processor may separate the localization and mapping functions onto different threads. For example, localization (i.e., current pose estimation) may be performed in real time on one thread, while the mapping thread runs processes in the background to minimize the differences between the tracked point locations and where the points are expected to be given the pose estimate (i.e., reprojection errors). Upon completion, the mapping thread updates the information used to track the set of points, and in turn the localization thread adds new observations to expand the map.

SLAM techniques may be applied to non-autonomous tasks by a robotic device, such as a remotely-controlled vehicle for bomb detection or search and rescue. For example, a robotic device may implement SLAM in a remote-control application to assist an operator to navigate the robotic device around an environment. In some embodiments, a robotic device may include various operational modes, such as a mode for manual control and another mode for an autonomous control. For example, a robotic device in the form of a vehicle may be manually-driven during an initial mapping stage, and later configured for autonomous control.

Figure 2:
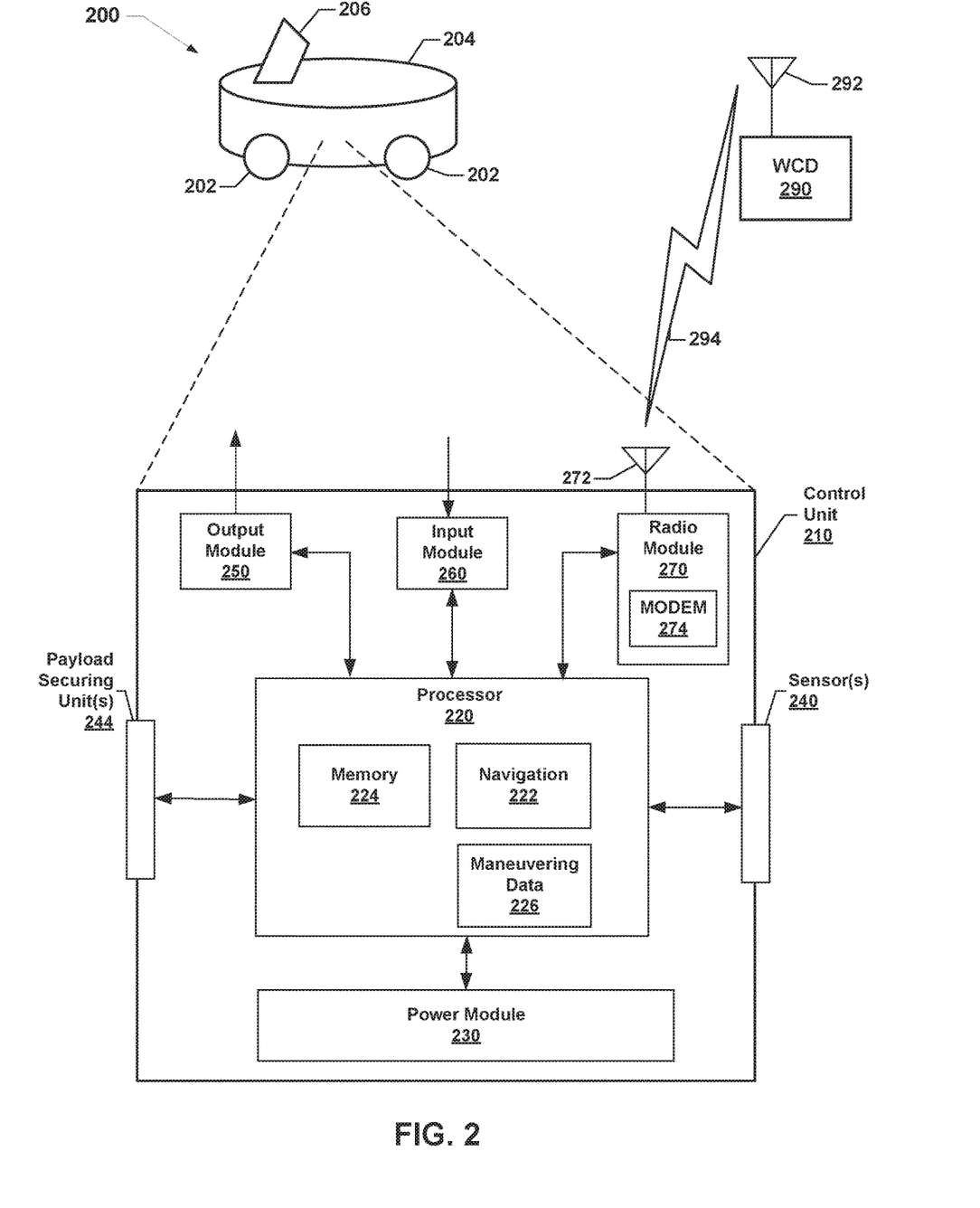
FIG. 2 is a component block diagram illustrating components of a robotic device suitable for use with various embodiments.

FIG. 2 illustrates an example robotic device 200 of a ground vehicle design that utilizes one or more wheels 202 driven by corresponding motors to provide locomotion. The robotic device 200 illustrated in FIG. 2 is an example of a robotic vehicle that may utilize various embodiments, but is not intended to imply or require that various embodiments are limited to ground robotic vehicles. For example, various embodiments may be used with rotorcraft or winged robotic vehicles, water-borne robotic vehicles, and space-based robotic vehicles.

With reference to FIGS. 1-2, the robotic device 200 may be similar to the robotic device 102. The robotic device 200 may include a number of wheels 202, a frame 204, at least one spatial measurement device 206, and a control unit 210.

The spatial measurement device(s) 206 may be the same as or similar to the spatial measurement device 103. In some embodiments, the spatial measurement device(s) 206 may include, for example, systems configured as raw range scan sensors, or feature-based systems configured to recognize landmarks from scans or images. For example, a laser-based scanner (e.g., Light Detection and Ranging (LiDAR)) or sonar-based system may be used to extract landmarks from scans. In some embodiments, landmarks may be extracted from images taken by any of a number of image sensors (e.g., cameras, optical readers, etc.). In some embodiments, any of a number of other devices capable of detecting a landmark in its vicinity may also be implemented as a spatial measurement device.

The frame 204 may provide structural support for the motors and their associated wheels 202 as well as for the spatial measurement device 206. For ease of description and illustration, some detailed aspects of the robotic device 200 are omitted such as wiring, frame structure interconnects, or other features that would be known to one of skill in the art. While the illustrated robotic device 200 has wheels 202, this is merely exemplary and various embodiments may include any variety of components to provide propulsion and maneuvering capabilities, such as treads, paddles, skids, or any combination thereof or of other components.

The control unit 210 that may house various circuits and devices used to power and control the operation of the robotic device 200. The control unit 210 may include a processor 220, a power module 230, sensors 240, one or more payload-securing units 244, an output module 250, an input module 260, and a radio module 270.

The processor 220 may be configured with processor-executable instructions to control travel and other operations of the robotic device 200, including operations of various embodiments. The processor 220 may include or be coupled to a navigation unit 222, a memory 224, and a maneuvering data module 226. The processor 220 and/or the navigation unit 222 may be configured to communicate with a server through a wireless connection (e.g., a cellular data network) to receive data useful in navigation, provide real-time position reports, and assess data.

The maneuvering data module 226 may be coupled to the processor 220 and/or the navigation unit 222, and may be configured to provide travel control-related information such as orientation, attitude, speed, heading, and similar information that the navigation unit 222 may use for navigation purposes, such as dead reckoning between Global Navigation Satellite System (GNSS).

The maneuvering data module 226 may receive inputs from one or more sensors 240, such as an IMU or similar sensors (e.g., accelerometer, a gyroscope, etc.). In some embodiments, the sensor(s) 240 providing input to the maneuvering data module 226 may include or overlap with the one or more spatial measurement devices 206. The input to the maneuvering data module 226 may provide data regarding the orientation and accelerations of the robotic device 200 that may be used in navigation and positioning calculations, as well as providing data used in various embodiments for processing images.

The processor 220 may further receive additional information from one or more sensors 240 (e.g., a camera, which may be a monocular camera) and/or other sensors. In some embodiments, the sensor(s) 240 may include one or more optical sensors capable of detecting infrared, ultraviolet, and/or other wavelengths of light. In some embodiments, the sensor(s) 240 may include and/or overlap with the range measurement device(s) 206. In some embodiments, the sensor(s) 240 may also include at least one sensor that provides motion feedback to the processor 220, for example, a wheel sensor (e.g., one or more wheel/rotary encoders), a contact or pressure sensor configured to provide a signal indicating contact with a surface, etc. The sensor(s) may also include one or more of a radio frequency (RF) sensor, a barometer, a sonar emitter/detector, a radar emitter/detector, a microphone or another acoustic sensor, or another sensor that may provide information usable by the processor 220 for movement operations as well as navigation and positioning calculations.

In some embodiments, the payload-securing units 244 may include an actuator motor that drives a gripping and release mechanism and related controls that are responsive to the control unit 210 to grip and release a payload in response to commands from the control unit 210.

The power module 230 may include one or more batteries that may provide power to various components, including the processor 220, the sensors 240, the payload-securing unit(s) 244, the drive motors coupled to the wheels 202, the output module 250, the input module 260, and the radio module 270. The power module 230 may be rechargeable. The processor 220 may be configured with processor-executable instructions to control the charging of the power module 230, such as by executing a charging control algorithm using a charge control circuit. Alternatively or additionally, the power module 230 may be configured to manage its own charging. The processor 220 may be coupled to the output module 250, which may output control signals for managing motors that drive the wheels 202 and other components.

The robotic device 200 may be maneuvered by controlling individual motors driving the wheels 202 as the robotic device 200 progresses toward a destination. The processor 220 may receive data from the navigation unit 222 and use such data in order to determine the present position and orientation of the robotic device 200, as well as the appropriate course towards the destination or intermediate sites. In various embodiments, the navigation unit 222 may include a GNSS receiver system (e.g., a GPS receiver) enabling the robotic device 200 to navigate using GNSS signals. Alternatively or in addition, the navigation unit 222 may be equipped with radio navigation receivers for receiving navigation beacons or other signals from radio nodes, such as navigation beacons (e.g., very high frequency (VHF) omni-directional range (VOR) beacons), Wi-Fi access points, cellular network sites, radio station, remote computing devices, robotic vehicles, etc.

The radio module 270 may be configured to receive navigation signals, such as signals from aviation navigation facilities, etc., and provide such signals to the processor 220 and/or the navigation unit 222 to assist in robotic device navigation. In various embodiments, the navigation unit 222 may use signals received from recognizable RF emitters (e.g., AM/FM radio stations, Wi-Fi access points, and cellular network base stations) on the ground.

The radio module 270 may include a modem 274 and a transmit/receive antenna 272. In some embodiments, the radio module 270 may be configured to conduct wireless communications with a variety of wireless communication devices (e.g., a wireless communication device (WCD) 290), examples of which include a wireless telephony base station or cell tower (e.g., the base station 104), a network access point (e.g., the access point 106), a beacon, a smartphone, a tablet, or another computing device (e.g., 110) with which the robotic device 200 may communicate. In some embodiments, the processor 220 may establish a bi-directional wireless communication link 294 via the modem 274 and the antenna 272 of the radio module 270 and the wireless communication device 290 via a transmit/receive antenna 292. In some embodiments, the radio module 270 may be configured to support multiple connections with different wireless communication devices using different radio access technologies.

In various embodiments, the wireless communication device 290 may be connected to a server through intermediate access points. In an example, the wireless communication device 290 may be a server of a robotic vehicle operator, a third party service (e.g., package delivery, billing, etc.), or a site communication access point. The robotic device 200 may communicate with a server through one or more intermediate communication links, such as a wireless telephony network that is coupled to a wide area network (e.g., the Internet) or other communication devices. In some embodiments, the robotic device 200 may include and employ other forms of radio communication, such as mesh connections with other robotic vehicles or connections to other information sources (e.g., balloons or other stations for collecting and/or distributing weather or other data harvesting information).

In various embodiments, the control unit 210 may be equipped with an input module 260, which may be used for a variety of applications. For example, the input module 260 may receive images or data from an onboard camera or sensor, or may receive electronic signals from other components (e.g., a payload).

Figure 3:
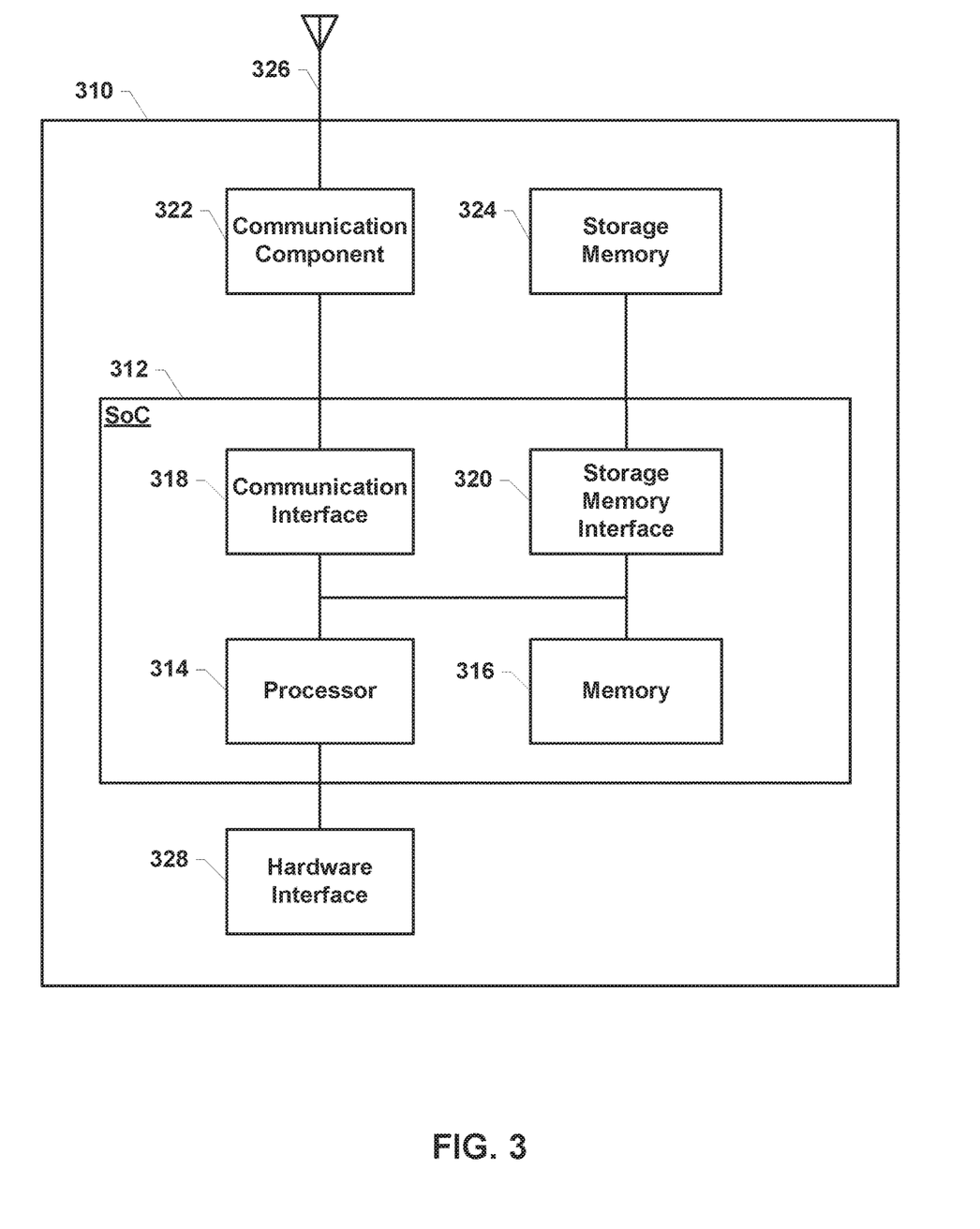
FIG. 3 is a component block diagram illustrating a processing device suitable for use in robotic devices implementing various embodiments.

While various components of the control unit 210 are illustrated in FIG. 2 as separate components, some or all of the components (e.g., the processor 220, the output module 250, the radio module 270, and other units) may be integrated together in a single processing device 310, an example of which is illustrated in FIG. 3.

With reference to FIGS. 1-3, the processing device 310 may be configured to be used in a robotic device and may be configured as or including a system-on-chip (SoC) 312. The SoC 312 may include (but is not limited to) a processor 314, a memory 316, a communication interface 318, and a storage memory interface 320.

The processing device 310 or the SoC 312 may further include a communication component 322, such as a wired or wireless modem, a storage memory 324, an antenna 326 for establishing a wireless communication link, and/or the like. The processing device 310 or the SoC 312 may further include a hardware interface 328 configured to enable the processor 314 to communicate with and control various components of a robotic device. The processor 314 may include any of a variety of processing devices, for example any number of processor cores.

The term "system-on-chip" (SoC) is used herein to refer to a set of interconnected electronic circuits typically, but not exclusively, including one or more processors (e.g., 314), a memory (e.g., 316), and a communication interface (e.g., 318). The SoC 312 may include a variety of different types of processors 314 and processor cores, such as a general purpose processor, a central processing unit (CPU), a digital signal processor (DSP), a graphics processing unit (GPU), an accelerated processing unit (APU), a subsystem processor of specific components of the processing device, such as an image processor for a camera subsystem or a display processor for a display, an auxiliary processor, a single-core processor, and a multicore processor. The SoC 312 may further embody other hardware and hardware combinations, such as a field programmable gate array (FPGA), an application-specific integrated circuit (ASIC), other programmable logic device, discrete gate logic, transistor logic, performance monitoring hardware, watchdog hardware, and time references. Integrated circuits may be configured such that the components of the integrated circuit reside on a single piece of semiconductor material, such as silicon.

The SoC 312 may include one or more processors 314. The processing device 310 may include more than one SoC 312, thereby increasing the number of processors 314 and processor cores. The processing device 310 may also include processors 314 that are not associated with a SoC 312 (i.e., external to the SoC 312). Individual processors 314 may be multicore processors. The processors 314 may each be configured for specific purposes that may be the same as or different from other processors 314 of the processing device 310 or SoC 312. One or more of the processors 314 and processor cores of the same or different configurations may be grouped together. A group of processors 314 or processor cores may be referred to as a multi-processor cluster.

The memory 316 of the SoC 312 may be a volatile or non-volatile memory configured for storing data and processor-executable instructions for access by the processor 314. The processing device 310 and/or SoC 312 may include one or more memories 316 configured for various purposes. One or more memories 316 may include volatile memories such as random access memory (RAM) or main memory, or cache memory.

Some or all of the components of the processing device 310 and the SoC 312 may be arranged differently and/or combined while still serving the functions of the various aspects. The processing device 310 and the SoC 312 may not be limited to one of each of the components, and multiple instances of each component may be included in various configurations of the processing device 310.

As described, a robotic device in various embodiments may utilize SLAM processes in order to navigate and in order to carry out tasks. Such processes may include mapping the spatial information of landmarks within the environment, as well as representing the robotic device's pose (i.e., position and orientation) relative to the mapped environment.

SLAM algorithms account for a variety of parameters, such as sensors, map representation, device dynamics, environmental dynamics, and the integration of sensor measurements and the robot's control system over time. Mapping the spatial information of the environment generally requires employing spatial sensors (e.g., spatial measurement device(s) 206) to which SLAM algorithms may be applied. For example, landmarks may be extracted from images obtained by one or multiple cameras, which may be any of a variety of configurations (e.g., monocular, stereo vision, multiple camera, etc.).

Localization of the robotic device may be performed by obtaining sensory information regarding the position and orientation (i.e., pose) of the device within the generated map.

For example, for vehicle-type robotic devices, pose information may be obtained from rotary encoders, which measure the rotational movement of the wheel(s). The robotic device may also use a GNSS receiver to obtain global position information to supplement or facilitate acquisition of pose information.

Configuring robotic devices with different types of sensors may enable robotic devices to operate in certain environments where camera-based navigation (e.g., SLAM) may be problematic. While inclusion of a plurality of sensor types enables a robotic device to receive a large set of information, each sensor may be vulnerable to failure and/or to providing outlier data in different scenarios. For example, a sensor used for computer vision, such as an image sensor (e.g., camera) may exhibit lower performance in a local environment that has dim lighting, such as indoors. As another example, when robotic devices configured to perform household tasks maneuver near walls, there may be few observable features for an image sensor to capture, thus limiting the data that SLAM techniques can use to navigate and map the environment. In another example, a wheel rotation sensor, such as a rotary encoder, may be prone to error on certain surfaces (e.g., slippery flooring or rugs as are common indoors) due to slippage or resistance, or due to an incline. In another example, a GNSS receiver may be unreliable indoors due to signal strength issues. In another example, if the robotic device maneuvers into a narrow area (e.g., a corner in a room), a collision sensor (e.g., in a bumper) may falsely detect a collision.

Further, in robotic devices configured to perform household tasks in an indoor environment, sensor capabilities and acuity may be limited in order to keep manufacturing costs low to enable pricing consistent with similar consumer products. As a result, performing accurate localization for such robotic devices may be complicated by the limitations of the on-board sensors.

Changes in conditions of a robotic device's local environment may occur in temporal and/or spatial patterns. For example, in an indoor environment, the level of lighting may sharply increase in the evening at a predictable time when the user returns home and turns on the indoor lights. As another example, lighting conditions may change significantly from room to room as an indoor robotic device maneuvers to perform household tasks. Further, the distribution of objects within the local environment may dynamically change, for example, based on movement of humans or pets.

Various embodiments may improve navigation by robotic devices by extracting and using patterns of variation in performance for each sensor. For example, in robotic devices configured for household tasks, such as a vacuum or other household cleaning robot, a processor performing localization, map generation, and path planning may be configured to recognize and use patterns in the constraints typically associated with an indoor environment, which may include limited landmarks in some locations (e.g., near walls and in empty rooms), limited maneuvering space, relatively small temperature variations, frequent and geographically-linked variations in illumination, etc.

The robotic device may record and store such patterns as semantic information, which may be used to dynamically adjust sensor input for performing localization. In this manner, semantic information may be accumulated over time for each sensor used in the navigation system, and utilized to change the weight given to the corresponding sensor, such as for pose estimation. Additionally or alternatively, the semantic information may be utilized to change the weight given to the corresponding sensor for map development. In some embodiments, the semantic information may be used for evaluating task priorities or other factors in path planning.

In some embodiments, the semantic information for a particular sensor may reflect a temporal pattern, such as a duration of time (e.g., every day, once per week, etc.) during which the sensor underperforms. In some embodiments, the semantic information for a particular sensor may reflect a spatial pattern, such as a specific region of the local environment in which the sensor underperforms. In some embodiments, the semantic information for a particular sensor may reflect both a temporal and spatial pattern, such as a duration of time in which the sensor underperforms in a specific region in the local environment. In this manner, the semantic information for a particular sensor may enable the system to infer a measure of reliability for that sensor.

Application of such sensor-specific reliability measures by the system, individually adjusting the weight given to data output from each specific sensor and using a weighted amalgamation of sensor data, may enable improved localization, map generation, and/or path planning in various operating situations, locations and times of day. Such improvements enabled by various embodiments may be particularly useful in indoor robotic devices where such conditions may be encountered more often than in outdoor operations.

Figure 4:
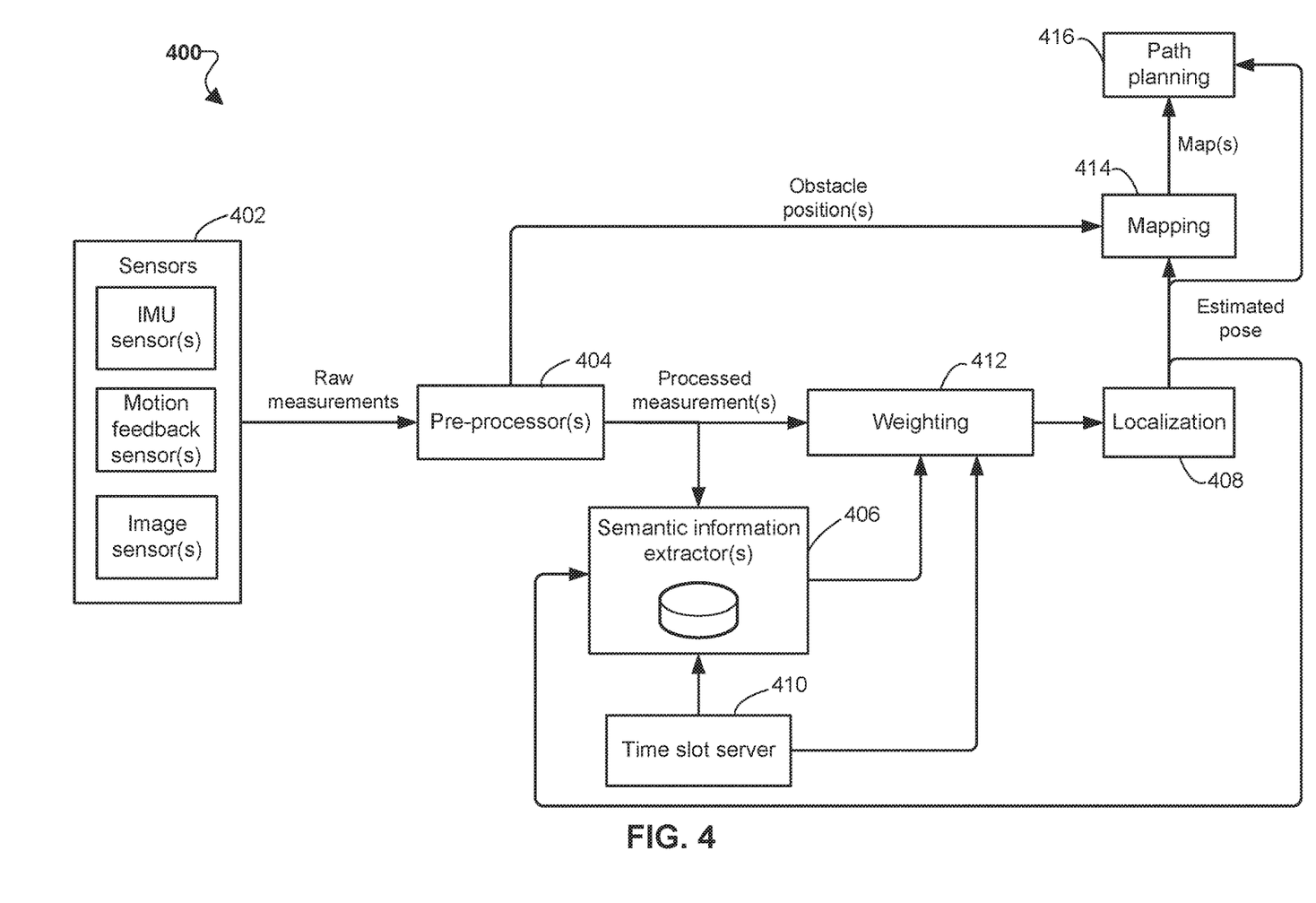
FIG. 4 is a block diagram illustrating a system for utilizing semantic information to adjust navigation of a robotic device according to various embodiments.

FIG. 4 is a functional block diagram of an example navigation system that uses semantic information according to various embodiments. With reference to FIGS. 1-4, the navigation system 400 may be implemented on a processor of a robotic device (e.g., 102, 200), such as a ground vehicle (e.g., vacuum robot, car, etc.), an aerial vehicle (e.g., UAV), etc.

In the navigation system 400, inputs may be received from multiple sensors in order to enable the system to perform localization, map generation, and path planning for SLAM processes on the robotic device. In some embodiments, sensors 402 may include at least one IMU sensor for detecting orientation or other maneuvering data. As described, the sensor(s) 402 may also include at least one motion feedback sensor, such as a wheel encoder, pressure sensor, or other collision or contact-based sensor. Further, the sensor(s) 402 may include at least one image sensor, such as a visual camera, an infrared sensor, a sonar detector, etc.

Raw measurement data from the sensors 402 may be provided to a pre-processor(s) 404. Pre-processing performed by the pre-processor 404 may include removal of outliers and noise suppression, as well as landmark/feature extraction, data association, etc. In various embodiments, the pre-processor(s) 404 may output processed measurements relating to position and orientation of the robotic device (e.g., acceleration, velocity, odometry information, etc.).

While shown together, the pre-processor(s) 404 may represent multiple pre-processors that each correspond to a different sensor or group of sensors. For example, some pre-processors may be configured to receive and jointly process raw measurements from multiple sensors, or may be configured to receive and process raw measurements from a single sensor 402.

Processed measurements from each pre-processor(s) 404 may be provided to semantic information extractor(s) 406, which may obtain semantic information about each sensor(s) 402 associated with the corresponding pre-processor(s) 404. Specifically, the semantic information extractor(s) 406 may be configured to identify and record specific adverse events relating to the associated sensor(s) 402. Such adverse events may include, for example, an outlier data measurement, a string of blank measurements from a sensor, data indicating a condition of the robotic device (e.g., device stuck, collision with obstacle, etc.), or any other measurement indicating diminished performance by one or more sensor.

In various embodiments, the semantic information extractor(s) 406 may store and update semantic information for each associated sensor 402. Such semantic information may be represented in any of a number of data structures, which may be stored in a database in local storage on the robotic device. Examples of data structures that may be used to represent the semantic information include, for example, a data table/array, tree, etc.

The type of data structure employed may be selected for efficiency based on the volume of semantic information collected. In some embodiments, semantic information that is relatively dense across time and space may be represented in a data array. For example, semantic information based on recording outlier sensor data may be best represented in a data array. In some embodiments, semantic information that is relatively sparse across time and space may be represented in a data tree. For example, semantic information based on recording events in which the robotic device is stuck may be best represented in a data tree.

In some embodiments, local storage may be a separate storage device, examples of which may include universal serial bus (USB) drives, memory cards, solid-state drives (SSDs), hard disk drives (HDDs), floppy disks, optical disks, magnetic tapes, and the like. For example, the local storage may be a removable storage device such as a memory card, for example, a PC Card, CompactFlash, SmartMedia, Memory Stick, Memory Stick Duo, Memory Stick PRO Duo, Miniature Card, Multimedia Card (MMC), Reduced Size Multimedia Card (RS-MMC), MMCmicro Card (MMCmicro), PS2 card, Secure Digital (SD) card, SxS, Universal Flash Storage (UFS), miniSD, microSD, xD-Picture Card, Intelligent Stick (iStick), etc. In some embodiments, the local storage may be a partition or part of a memory device (e.g., 224).

An adverse event may be detected in various embodiments by comparing the processed measurements from the corresponding pre-processor 404 with a current estimated pose for the robotic device. In various embodiments, feedback from a localization module 408 for SLAM may provide the current estimated pose to each semantic information extractor(s) 406. If the difference between a pose indicated by the processed measurement(s) from the pre-processor 404 and the current estimated pose is greater than a predetermined threshold, the semantic information extractor 406 may record an adverse event for the related one or more associated sensor(s) 402. Specifically, the semantic information extractor 406 may identify a timeslot during which the adverse event occurred within a time period by accessing a timeslot server 410. In some embodiments, the timeslot server 410 may maintain independent time period and timeslot instructions for each semantic information extractor 406.

Using the current estimated pose and the timeslot, the semantic information extractor 406 may update the stored semantic information for the related one or more associated sensor(s) 402. The semantic information extractor 406 may periodically seek to identify patterns in the adverse event occurrence across timeslots and/or poses for each associated sensor 402, such as when each time period ends. In various embodiments, an identified pattern for an associated sensor 402 may represent a temporal and/or spatial pattern of inaccuracy for that sensor. Any such identified inaccuracy patterns may be provided to a weighting module 412, which may receive the processed measurement(s) from the corresponding pre-processor 404. In various embodiments, the weighting module 412 may adjust the weight given to data (i.e., processed measurement(s)) from the related associated sensor(s) 402 based on the identified inaccuracy pattern. For example, such adjustment may involve lowering the weighting factor of data from a sensor 402 for a specific time duration, or when the robotic device is located in a particular spatial region. That is, the degree and manner of use of the data from a particular sensor 402 may depend in part on the reliability of that sensor, as inferred using any corresponding identified inaccuracy pattern.

After adjusting weighting factor(s) based on identified inaccuracy patterns derived from semantic information, the processed measurements may be provided to the localization module 408. As discussed, the localization module 408 may generate a current estimated pose for the robotic device as part of SLAM processes. In addition to providing the current estimated pose to the semantic information module(s) 406, the localization module 408 may provide such information to a mapping module 414 and to a path planning module 416. In various embodiments, the pre-processing module(s) 404 may provide data about the position of obstacles in the local environment to the mapping module 414. The pre-processor(s) 404 that provide such obstacle position information, as well as their associated sensor(s) 402, may be either the same as or different from those used to provide processed measurements to the semantic information extractor(s) 406. In some embodiments, the obstacle position information may be computed based on an identified set of points and/or landmarks in the local environment. For example, in an indoor environment, such landmarks may include walls, particularly features on walls, furniture, and/or other permanent fixtures within a home or building. In some embodiments, the mapping module 414 may utilize the current estimated pose and obstacle position information to construct at least one map of the local environment (e.g., of a room in which the robotic device is operating). For example, in using SLAM techniques, the mapping module 414 may generate a map with spatial representations of the local environment for navigation, as well as update mapping information relative to the robotic device about features (e.g., permanent fixtures and similar landmarks).

The map(s) generated by the mapping module 414 may be provided to the path planning module 416. The path planning module 416 may use the received map(s) and the current estimated pose information to select, create, or update a navigation path for the robotic device.

Figure 5:
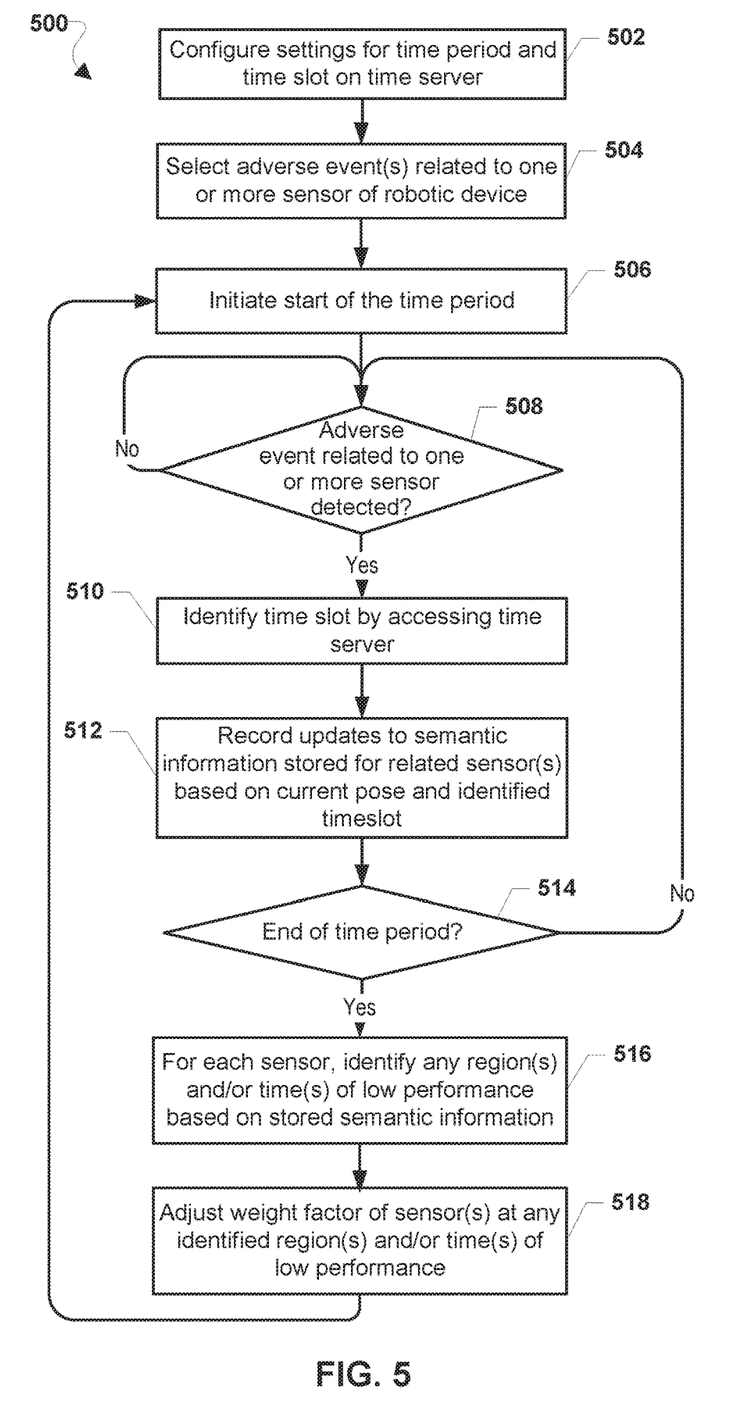
FIG. 5 is a process flow diagram illustrating an example method for extracting and using semantic information to improve navigation by a robotic device.

FIG. 5 illustrates a method 500 for extracting and using semantic information to improve navigation on a robotic device according to various embodiments. Referring to FIGS. 1-5, the operations of the method 500 may be implemented by one or more processors of a robotic device, such as the robotic device 102, 200, the processor 220, or the processing device 310. The one or more processor may include, for example, the processor(s) 314, or a separate controller (not shown) that may be coupled to memory, such as the memory 224 or storage memory 324.

In block 502, a processor of the robotic device may configure settings for a time period and timeslot on a time server. The time period and timeslot may be configured to define a time span and resolution for collecting semantic information of sensor(s) (e.g., 240, 402) associated with a pre-processor (e.g., 402). An example time period setting may be 24 hours, and example timeslot setting may be one hour. Specifically, semantic information may be recorded for each hour over a period of 24 hours, which may be repeated following evaluation by the navigation system. In some embodiments, separate time period and timeslot settings may be configured for each pre-processor in the navigation system.

In block 504, the processor may select at least one adverse event related to one or more sensors of the robotic device. In various embodiments, adverse events may be events that indicate sensor unreliability. Examples of adverse events that may be selected include outlier data measurements, measurements indicating a condition of the robotic device (e.g., collision, getting stuck, etc.), a string of blank measurements from one or more sensors, etc. In some embodiments, an adverse event may be a hardware-based event based on the particular sensors and build of the robotic device.

In block 506, the processor may initiate the start of the time period, which may be tracked in real time by the time server. In various embodiments, the time server may maintain a clock for the time period, as well as an indicator of the current timeslot within the time period.

The processor may determine whether any adverse event related to one or more sensor of the robotic device is detected in determination block 508. As long as no adverse event is detected (i.e., determination block 508="No"), the processor may repeat determining whether any adverse event is detected in determination block 508.

In response to determining that an adverse event related to one or more sensor is detected (i.e., determination block 508="Yes"), the processor may identify the time slot in which the adverse event has occurred by accessing the time server in block 510.

In block 512, the processor may record updates to the semantic information that is stored for the related sensor(s) based on the current pose of the robotic device and the identified timeslot. In various embodiments, the current estimated pose (i.e., position and orientation) for the robotic device may be identified through localization processes. Recording the adverse event may involve, per timeslot, incrementing a separate count of occurrences of the adverse event at each pose of the robotic device. In some embodiments, the updates to the semantic information may involve calculating a probability of the event's occurrence for each pose and timeslot.

In determination block 514, the processor may determine whether the time period has ended. In response to determining that the time period has not ended, the processor may again determine whether any adverse event related to one or more sensor of the robotic device is detected in determination block 508.

In response to determining that the time period has ended (i.e., determination block 514="Yes"), the processor may identify, for each sensor of the robotic device, any region and/or times of low performance based on the stored semantic information in block 516. That is, the processor may identify any patterns of adverse events that occurred for the sensor during a specific timeslot or while in a specific pose or location, which provides a sensor-specific pattern of inaccuracy. Such identification may be based on a number of adverse events occurring that is greater than an event threshold. For example, a first event threshold may be established for the count of adverse events occurring within a timeslot, and a second event threshold may be established for the count of adverse events occurring at a pose of the robotic device. In various embodiments, such patterns of inaccuracy, if identified, may be used to make conclusions about the performance of that sensor at particular time(s) corresponding to the timeslot, and/or while the device is within a spatial region(s) corresponding to the pose.

In block 518, the processor may adjust a weighting factor for one or more sensors at any corresponding spatial region or time of low performance. For example, using an identified pattern of inaccuracy for a sensor, the processor may apply a weighting factor to downscale the value of measurements taken by that sensor during particular time(s), and/or when the robotic device is within the particular spatial region(s).

The processor may again initiate the start of the time period in block 506.

Figure 6:
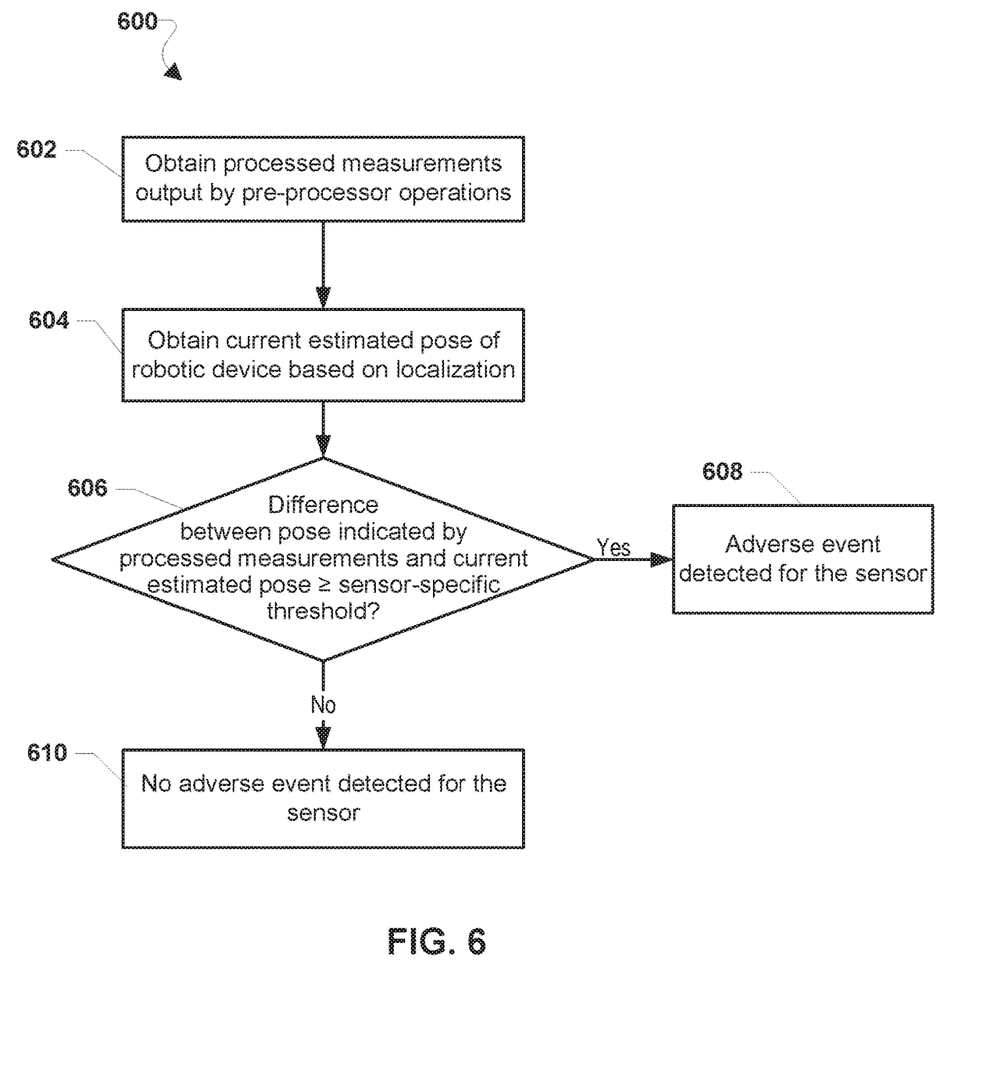
FIG. 6 is a process flow diagram illustrating an example method for identifying an adverse event related to one or more sensor as part of the navigation implemented in FIG. 5.

FIG. 6 illustrates a method 600 of detecting an adverse event related to one or more sensors in block 508 of the method 500. Operations of the method 600 may be performed with respect to each sensor of the robotic device, the type and capacities of which may depend on the tasks for which the robotic device is designed. For example, a vacuum robot or other household appliance robotic device may be configured with one or more cliff sensors (e.g., underside infrared sensor), wall sensor(s) (e.g., front-facing infrared sensor), bump sensor(s) (e.g., touch sensor), optical sensor(s), etc. With reference to FIGS. 1-6, the operations of the method 600 may be implemented by one or more processors of a robotic device, such as the robotic device 102, 200, the processor 220, or the processing device 310. The one or more processors may include, for example, the processor(s) 314, or a separate controller (not shown) that may be coupled to memory, such as the memory 224 or storage memory 324.

In block 602, the processor may obtain processed measurements that are output as a result of pre-processor operations. For example, the processed measurements may be data relating to position and orientation of the robotic device, with outlier data measurements removed.

In block 604, the processor may obtain the current estimated pose of the robotic device based on localization. For example, the current pose may be calculated in performing localization for a SLAM system.

In determination block 606, the processor may determine whether the difference between a pose indicated by the obtained processed measurements and the current estimated pose calculated through localization satisfies or exceeds a threshold. In some embodiments, a different threshold may be configured for each sensor by the robotic device, and may depend on the acuity/capabilities of the various sensors.

In response to determining that the difference between a pose indicated by the obtained processed measurements and the current estimated pose calculated through localization is greater than the threshold (i.e., determination block 606="Yes"), the processor may detect an adverse event for the sensor in block 608. In this manner, the processor may identify a present indication of unreliability for the particular sensor of the robotic device.

In response to determining that the difference between a pose indicated by the processed measurements and the current estimated pose calculated through localization is not greater than the threshold (i.e., determination block 606="No"), the processor may detect that no adverse event has occurred for the sensor in block 610.

Various embodiments enable the processor of the robotic device to improve the calibration of an image sensor of the robotic device. Various embodiments also improve the accuracy of the robotic device's SLAM capabilities using a more accurately calibrated image sensor. Various embodiments also improve capability of a robotic device to calibrate a monocular image sensor for use with SLAM determinations.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods 500 and 600 may be substituted for or combined with one or more operations of the methods 500 and 600, and vice versa.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method of improving navigation, the method comprising:
    initiating, by a processor in a robotic device, a start of a predetermined time period associated with semantic information extraction;
    detecting, during the predetermined period, an adverse event that indicates sensor unreliability of the one or more sensors;
    in response to detecting the adverse event that indicates sensor unreliability of the one or more sensors:
        identifying a current time slot of the predetermined time period;
        identifying a current estimated position and orientation of the robotic device; and
        recording updates to semantic information stored for the one or more sensors based on the current time slot and the current estimated position and orientation of the robotic device; and
    identifying a pattern of adverse events for a position and orientation of robotic device based on the recorded semantic information after the end of the predetermined time period.

2. The method of claim 1, further comprising:
    in response to determining that the predetermined time period has ended:
        identifying, for each sensor, any spatial region of low performance within a local environment of the robotic device based on stored semantic information; and
        adjusting a weight factor applied to measurements from the sensor when the robotic device is at an identified spatial region of low performance.

3. The method of claim 2, further comprising, in response to determining that the predetermined time period has ended:
    identifying, for each sensor, any times of low performance based on corresponding semantic information; and
    adjusting the weight factor applied to measurements from each sensor during identified times of low performance.

4. The method of claim 2, wherein identifying, for each sensor, any spatial region of low performance comprises:
    determining whether the stored semantic information for the sensor indicates that a number of adverse event occurrences for a specific pose of the robotic device satisfies or exceeds a first event threshold.

5. The method of claim 4, wherein identifying, for each sensor, any time of low performance comprises determining whether the stored semantic information indicates that a number of adverse event occurrences during a specific timeslot satisfies or exceeds a second event threshold.

6. The method of claim 1, further comprising for each sensor:
    obtaining processed measurements output by pre-processor operations for the sensor;
    obtaining the current estimated position and orientation of the robotic device; and
    determining whether a difference between a pose indicated by the processed measurements and the current estimated position and orientation satisfies or exceeds a sensor-specific threshold.

7. The method of claim 1, wherein detecting the adverse event that indicates sensor unreliability of the one or more sensors further comprises determining that the adverse event is detected in response to receiving an outlier data measurement.

8. The method of claim 1, wherein the predetermined time period associated with semantic information extraction is configured on a time server, wherein the time server maintains settings for timeslots of the predetermined time period.

9. The method of claim 1, wherein identifying the current estimated position and orientation of the robotic device comprises obtaining output from localization operations on the robotic device, wherein the localization operations are performed as part of a simultaneous localization and mapping (SLAM) process.

10. The method of claim 1, wherein the robotic device is a ground vehicle, and wherein the one or more sensors of the robotic device comprises at least one image sensor, at least one inertial measurement unit (IMU) sensor, and at least one motion feedback sensor.

11. The method of claim 1, wherein the semantic information stored for the one or more sensors is represented in a data structure that provides a number of adverse event occurrences for each pose of the robotic device during each timeslot of the predetermined time period.

12. A robotic device, comprising:
one or more sensors; and
a processor coupled to the one or more sensors and configured with processor-executable instructions to:
initiate a start of a predetermined time period associated with semantic information extraction;
detect, during the predetermined period, an adverse event that indicates sensor unreliability of the one or more sensors;
in response to detecting the adverse event that indicates sensor unreliability of the one or more sensors:
identify a current time slot of the predetermined time period;
identify a current estimated position and orientation of the robotic device; and
record updates to semantic information stored for the one or more sensors based on the current time slot and the current estimated position and orientation of the robotic device; and
identify a pattern of adverse events for a position and orientation of robotic device based on the recorded semantic information after the end of the predetermined time period.

13. The robotic device of claim 12, wherein the processor is further configured with processor-executable instructions to:
in response to determining that the predetermined time period has ended:
identify, for each sensor, any spatial region of low performance within a local environment of the robotic device based on stored semantic information; and
adjust a weight factor applied to measurements from the sensor when the robotic device is at an identified spatial region of low performance.

14. The robotic device of claim 13, wherein the processor is further configured with processor-executable instructions to:
identify, for each sensor, any times of low performance based on corresponding semantic information in response to determining that the predetermined time period has ended; and
adjust the weight factor applied to measurements from each sensor during identified times of low performance.

15. The robotic device of claim 13, wherein the processor is further configured with processor-executable instructions to identify, for each sensor, any spatial region of low performance by:
determining whether the stored semantic information for the sensor indicates that a number of adverse event occurrences for a specific pose of the robotic device satisfies or exceeds a first event threshold.

16. The robotic device of claim 15, wherein the processor is further configured with processor-executable instructions to identify, for each sensor, any time of low performance by determining whether the stored semantic information indicates that a number of adverse event occurrences during a specific timeslot satisfies or exceeds a second event threshold.

17. The robotic device of claim 12, wherein the processor is further configured with processor-executable instructions to:
obtain processed measurements output by pre-processor operations for each sensor;
obtain the current estimated position and orientation of the robotic device; and
determine whether a difference between a pose indicated by the processed measurements and the current estimated position and orientation satisfies or exceeds a sensor-specific threshold for each sensor.

18. The robotic device of claim 12, wherein the processor is further configured with processor-executable instructions to detect that the adverse event that indicates sensor unreliability of the one or more sensors in response to receiving an outlier data measurement.

19. The robotic device of claim 12, wherein the predetermined time period associated with semantic information extraction is configured on a time server, wherein the time server maintains settings for timeslots of the predetermined time period.

20. The robotic device of claim 12, wherein the processor is further configured with processor-executable instructions to identify the current estimated position and orientation of the robotic device by obtaining output from localization operations on the robotic device, wherein the localization operations are performed as part of a simultaneous localization and mapping (SLAM) process.

21. The robotic device of claim 12, wherein the robotic device is a ground vehicle, and wherein the one or more sensors comprise at least one image sensor, at least one inertial measurement unit (IMU) sensor, and at least one motion feedback sensor.

22. The robotic device of claim 12, wherein the semantic information stored for the one or more sensors is represented in a data structure that provides a number of adverse event occurrences for each pose of the robotic device during each timeslot of the predetermined time period.

23. The robotic device of claim 12, wherein the robotic device is configured to operate within a building.

24. A robotic device, comprising:
means for initiating a start of a predetermined time period associated with semantic information extraction;
means for detecting, during the predetermined period, an adverse event that indicates sensor unreliability of the one or more sensors;
means for identifying a current time slot of the predetermined time period in response to detecting the adverse event that indicates sensor unreliability of the one or more sensors;
means for identifying a current estimated position and orientation of the robotic device in response to detecting the adverse event that indicates sensor unreliability of the one or more sensors;
means for recording updates to semantic information stored for the one or more sensors based on the current time slot and the current estimated position and orientation of the robotic device in response to detecting the adverse event that indicates sensor unreliability of the one or more sensors; and
means for identifying a pattern of adverse events for a position and orientation of robotic device based on the recorded semantic information after the end of the predetermined time period.

25. A processing device for use in a robotic device, the processing device including a processor configured to:
- initiate a start of a predetermined time period associated with semantic information extraction;
- detect, during the predetermined period, an adverse event that indicates sensor unreliability of the one or more sensors;
- in response to detecting the adverse event that indicates sensor unreliability of the one or more sensors the processor is further configured to:
  - identify a current time slot of the predetermined time period;
  - identify a current estimated position and orientation of the robotic device; and
  - record updates to semantic information stored for the one or more sensors based on the current time slot and the current estimated position and orientation of the robotic device; and
- identify a pattern of adverse events for a position and orientation of robotic device based on the recorded semantic information after the end of the predetermined time period.

26. The processing device of claim 25, wherein the processor is further configured to:
- in response to determining that the predetermined time period has ended:
  - identify, for each sensor, any spatial region of low performance within a local environment of the robotic device based on stored semantic information; and
  - adjust a weight factor applied to measurements from the sensor when the robotic device is at an identified spatial region of low performance.

27. The processing device of claim 26, wherein the processor is further configured to:
- identify, for each sensor, any times of low performance based on corresponding semantic information in response to determining that the predetermined time period has ended; and
- adjust the weight factor applied to measurements from each sensor during identified times of low performance.

28. The processing device of claim 26, wherein the processor is further configured to identify, for each sensor, any spatial region of low performance by:
- determining whether the stored semantic information for the sensor indicates that a number of adverse event occurrences for a specific pose of the robotic device satisfies or exceeds a first event threshold.

29. The processing device of claim 28, wherein the processor is further configured to identify, for each sensor, any time of low performance by determining whether the stored semantic information indicates that a number of adverse event occurrences during a specific timeslot satisfies or exceeds a second event threshold.

30. The processing device of claim 25, wherein the processor is further configured to:
- obtain processed measurements output by pre-processor operations for each sensor;
- obtain the current estimated position and orientation of the robotic device; and
- determine whether a difference between a pose indicated by the processed measurements and the current estimated position and orientation satisfies or exceeds a sensor-specific threshold for each sensor.

31. The processing device of claim 25, wherein the processor is further configured to detect the adverse event that indicates sensor unreliability of the one or more sensors in response to receiving an outlier data measurement.

32. The processing device of claim 25, wherein the predetermined time period associated with semantic information extraction is configured on a time server, wherein the time server maintains settings for timeslots of the predetermined time period.

33. The processing device of claim 25, wherein the processor is further configured to identify the current estimated position and orientation of the robotic device by obtaining output from localization operations on the robotic device, wherein the localization operations are performed as part of a simultaneous localization and mapping (SLAM) process.

34. The processing device of claim 25, wherein the robotic device is a ground vehicle, and wherein the one or more sensors comprise at least one image sensor, at least one inertial measurement unit (IMU) sensor, and at least one motion feedback sensor.

35. The processing device of claim 25, wherein the semantic information stored for the one or more sensors is represented in a data structure that provides a number of adverse event occurrences for each pose of the robotic device during each timeslot of the predetermined time period.

* * * * *